(12) United States Patent
Schaefer

(10) Patent No.: US 7,678,018 B2
(45) Date of Patent: Mar. 16, 2010

(54) METHOD FOR IMPLEMENTING SHIFTS FROM A SOURCE GEAR TO A TARGET GEAR OF AN AUTOMATIC SHIFT TRANSMISSION, IN PARTICULAR DOWNSHIFTS OF AN AUTOMATIC SHIFT TRANSMISSION

(75) Inventor: Stephan Schaefer, Wahrstedt (DE)

(73) Assignee: Volkswagen AG, Wolfsburg (DE)

( * ) Notice: Subject to any disclaimer, the term of this patent is extended or adjusted under 35 U.S.C. 154(b) by 394 days.

(21) Appl. No.: 11/805,322

(22) Filed: May 23, 2007

(65) Prior Publication Data
US 2007/0287592 A1     Dec. 13, 2007

(30) Foreign Application Priority Data
May 24, 2006   (DE)   ................. 10 2006 024 884

(51) Int. Cl.
*F16H 59/00* (2006.01)
(52) U.S. Cl. .................. 477/132; 477/135; 477/139; 477/140
(58) Field of Classification Search ................ 477/132, 477/133, 135, 136, 139–141
See application file for complete search history.

(56) References Cited

U.S. PATENT DOCUMENTS

| | | | |
|---|---|---|---|
| 5,267,492 A | 12/1993 | Furukawa et al. | |
| 6,009,768 A * | 1/2000 | Hoshiya et al. | 74/336 R |
| 6,090,008 A * | 7/2000 | Hoshiya et al. | 477/84 |
| 6,220,987 B1 * | 4/2001 | Robichaux et al. | 477/97 |
| 7,052,436 B2 | 5/2006 | Döbele | |

FOREIGN PATENT DOCUMENTS

| | | |
|---|---|---|
| DE | 10151909 A1 | 4/2003 |
| DE | 10308797 A1 | 6/2004 |
| DE | 4132828 B4 | 2/2006 |

OTHER PUBLICATIONS

Search Report issued by the German Patent Office, dated Jan. 22, 2008.

* cited by examiner

*Primary Examiner*—Ha D. Ho
(74) *Attorney, Agent, or Firm*—Manfred Beck, P.A.

(57) ABSTRACT

A method for implementing shifts from a source gear to a target gear of an automatic shift transmission includes storing a respective upshift threshold and a respective downshift threshold for each possible sequential gear shift. The respective upshift threshold and the respective downshift threshold are defined in dependence of an accelerator pedal position, such that a limit value that is valid for a respective upshift or downshift is stored as a vehicle speed value in a control device. The vehicle speed that changes while the motor vehicle is driving and a changing accelerator pedal position are measured. Downshifts are simplified for a driver by configuring at least two downshift thresholds to be substantially horizontally extending in a first region of a possible accelerator pedal position and at least partly step-shaped in a second region of the possible accelerator pedal position.

12 Claims, 2 Drawing Sheets

METHOD FOR IMPLEMENTING SHIFTS FROM A SOURCE GEAR TO A TARGET GEAR OF AN AUTOMATIC SHIFT TRANSMISSION, IN PARTICULAR DOWNSHIFTS OF AN AUTOMATIC SHIFT TRANSMISSION

CROSS-REFERENCE TO RELATED APPLICATION

This application claims the priority, under 35 U.S.C. § 119, of German application DE 10 2006 024 884.8, filed May 24, 2006; the prior application is herewith incorporated by reference in its entirety.

BACKGROUND OF THE INVENTION

Field of the Invention

The invention relates to a method for implementing the shifts from a source gear into a target gear of an automatic shift transmission, in particular the downshifts of an automatic shift transmission, wherein for each possible sequential gear change a respective upshift threshold and downshift threshold, which is defined in dependence of the accelerator pedal position, is stored, namely the limit value that is valid for the respective upshift or downshift is stored as a vehicle speed value in a control device, and wherein the vehicle speed, which changes while the vehicle is driving, and the changing accelerator pedal position are measured.

Conventional automatic shift transmissions, in particular automated shift transmissions such as in particular also dual-clutch transmissions, are correspondingly controlled with the help of a control device, i.e. the upshifts and downshifts in these shift transmissions are implemented via a respectively given shift strategy. In general, so-called upshift thresholds and downshift thresholds, which are respectively defined for possible sequential gear changes, or corresponding characteristic curves, are stored in a control device, wherein the vehicle speed, which changes while the motor vehicle is driving, and respectively, the changing accelerator pedal position are preferably continuously measured, in order to then correspondingly implement a corresponding shift in the automatic shift transmission also in an automatic manner by a corresponding comparison with the defined upshift thresholds and, respectively, the downshift thresholds.

A conventional driving strategy for selecting a gear for a downshift in a conventional automatic shift transmission is illustrated in FIG. 1. The automatic shift transmission, which is to perform a gear shift in this case, preferably has six gears, that is six gear stages. If a source gear, for example the sixth gear "gear 6" is engaged in the automatic shift transmission, then the new target gear of the automatic shift transmission is selected in dependence of the measured current vehicle speed and in dependence of the current accelerator pedal position. Corresponding downshift thresholds (characteristic curves) in dependence of the vehicle speed and, respectively, the accelerator pedal position are stored in the control device for this purpose, as is illustrated in FIG. 1.

The corresponding "downshift thresholds" for shifting gears are schematically shown in FIG. 1, such as for example from sixth gear into fifth gear, namely from 6→5, from fifth gear into fourth gear 5→4, from fourth gear into third gear 4→3, and from third gear into second gear 3→2. The downshift threshold for shifting from second gear into first gear is not shown.

The individual specific vehicle speed values (limit values) for the specific accelerator pedal positions are stored in a control device. In other words, for given shifts or gear changes, corresponding downshift threshold values, which are called "limit values" in the following, are stored in the control device in dependence of a given accelerator pedal position and, respectively, in dependence of a given vehicle speed. The downshift threshold values, i.e. the corresponding limit values, that exist for a specific shift, for example from fourth gear into third gear 4→3, then form a given downshift threshold (downshift characteristic curve) along the accelerator pedal deflection (pedal travel) from 0% to 100%. Thus, between the individual downshift thresholds there are intermediate regions, into which the respective current measured vehicle speed falls or may fall.

As can be seen in FIG. 1, only the corresponding downshift thresholds are illustrated, as has in part already been described above. The conventional downshift characteristic map shown in FIG. 1 and, respectively, the downshift thresholds shown here increase slightly in a first region of the accelerator pedal position or accelerator pedal deflection, but tend to increase more rapidly in an adjacent second region. Suppose the vehicle were to move at 126 km/h, which is indicated by the corresponding solid line $V_F$, and the accelerator pedal position were less than 78%, then the sixth gear would be engaged in the automatic shift transmission. If the accelerator pedal position is increased to about 78%, then the downshift threshold 6→5 would be reached at a speed of 126 km/h and the automatic shift transmission would then shift down into fifth gear. The next downshift threshold 5→4 would be reached at an accelerator pedal position of about 92% and the third downshift threshold 4→3 would be reached at a so called "kick-down," i.e. at an accelerator pedal position >100% which is shown here as "110%."

The accelerator pedal hysteresis FH, which is schematically shown in FIG. 1, is in this case about 14%. If one tried to increase the accelerator pedal hysteresis FH, then the accelerator pedal hysteresis FH for the next downshift at a lower speed would probably have to be reduced too drastically, such that the driver would have to be very sensitive in terms of the controllability of the accelerator pedal position, in order to bring about a specific downshift. Conventional downshift characteristic maps therefore allow only highly limited degrees of freedom for downshifts that are to be induced by the driver and can therefore not yet be implemented in an optimal manner. For fuel consumption reasons and comfort reasons, later downshifts, i.e. downshifts at larger accelerator pedal deflections, are indeed highly beneficial, in order to really be able to fully utilize the engine power in a higher gear. This goal cannot be carried out to a sufficient extent with the conventional downshift characteristic maps, because the exact gear selection via the accelerator pedal input of the driver (the controllability mentioned above) would suffer severely, which in turn would also result in frequent double-downshifts.

SUMMARY OF THE INVENTION

It is accordingly an object of the invention to provide a method for implementing shifts from a source gear to a target gear of an automatic shift transmission which overcomes the above-mentioned disadvantages of the heretofore-known methods of this general type and which, on the one hand, avoids double downshifts and, on the other hand, allows the driver to perform a more precise gear selection via the accelerator pedal input, wherein preferably the full engine power can be utilized in a high gear.

With the foregoing and other objects in view there is provided, in accordance with the invention, a method for implementing shifts from a source gear to a target gear of an automatic shift transmission, which includes the following steps:

storing a respective upshift threshold and a respective downshift threshold for each possible sequential gear shift, the respective upshift threshold and the respective downshift threshold being defined in dependence of an accelerator pedal position, such that a limit value that is valid for a respective upshift or downshift is stored as a vehicle speed value in a control device;

configuring at least two downshift thresholds to be substantially horizontally extending in a first region of a possible accelerator pedal position and at least partly step-shaped in a second region of the possible accelerator pedal position;

measuring a vehicle speed that changes while a motor vehicle is driving; and measuring a changing accelerator pedal position.

In other words, according to the invention, there is provided, a method for implementing the shifts from a source gear into a target gear of an automatic shift transmission, in particular the downshifts of an automatic shift transmission, wherein for each possible sequential gear change respectively an upshift threshold and downshift threshold defined in dependence of the accelerator pedal position, namely the limit value that is valid for the respective upshift or downshift is stored as a vehicle speed value in a control device and wherein the vehicle speed, which changes while the vehicle is driving, and the changing accelerator pedal position are measured, and wherein at least two of the downshift thresholds are configured to extend substantially horizontally in a first region (I) of the possible accelerator pedal position and are configured to be at least partly step-shaped in a second region (II) of the possible accelerator pedal position.

The combination of these features allows an improved controllability, i.e. a more precise gear selection for the driver via the accelerator pedal input. Essentially fixed accelerator pedal supporting points are implemented via specifically configured downshift thresholds, namely due to implementing step-shaped sections in the second region of the corresponding respective downshift threshold. Before that, i.e. in the first region as well as in the second region between the respective step-shaped jumps, the downshift thresholds proceed substantially constant or parallel, as will be explained in more detail in the following. As a result of this, the engine torque, in particular the engine power, can be better utilized, which in turn reduces fuel consumption and increases the driving comfort. The vehicle seems less nervous because also fewer downshifts occur, and additionally the noise level decreases. Furthermore, due to the implementation of only a few downshifts, the wear of the engine and the transmission is reduced, which increases the operating live. In other words, shifts are implemented at relatively low rotational speeds, because the full engine power can be utilized as long as possible in the respective high gear. The above-mentioned disadvantages can therefore be avoided and corresponding advantages are achieved.

Another mode of the method of the invention includes configuring the downshift thresholds such that they extend parallel with respect to one another in the first region of the accelerator pedal position.

A further mode of the method of the invention includes configuring the downshift thresholds such that they have step-shaped sections in the second region of the accelerator pedal position.

Another mode of the method of the invention includes configuring the step-shaped sections of adjacent ones of the downshift thresholds such that an accelerator pedal hysteresis provided between the step-shaped sections is substantially constant.

Yet another mode of the method of the invention includes configuring the step-shaped sections of adjacent ones of the downshift thresholds such that an accelerator pedal hysteresis provided between the step-shaped sections is substantially 20% of a possible total accelerator pedal deflection.

Another mode of the method of the invention includes configuring the at least two downshift thresholds such that the first region of the accelerator pedal position covers substantially 0% to 60% of an accelerator pedal deflection and the second region of the accelerator pedal position covers substantially 60% to 100% of the accelerator pedal deflection.

Another mode of the method of the invention includes configuring an engine such that the engine reaches substantially its full total power at 80% accelerator pedal position/accelerator pedal deflection.

Another mode of the method of the invention includes implementing a kick-down shift at an accelerator pedal position/accelerator pedal deflection of greater than 100%.

A further mode of the method of the invention includes ensuring a good reproducibility of a gear selection by a driver by forming the step-shaped sections of the downshift thresholds.

Another mode of the method of the invention includes implementing a downshift from a source gear to a target gear in an automatic shift transmission.

Other features which are considered as characteristic for the invention are set forth in the appended claims.

Although the invention is illustrated and described herein as embodied in a a method for implementing shifts from a source gear to a target gear of an automatic shift transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
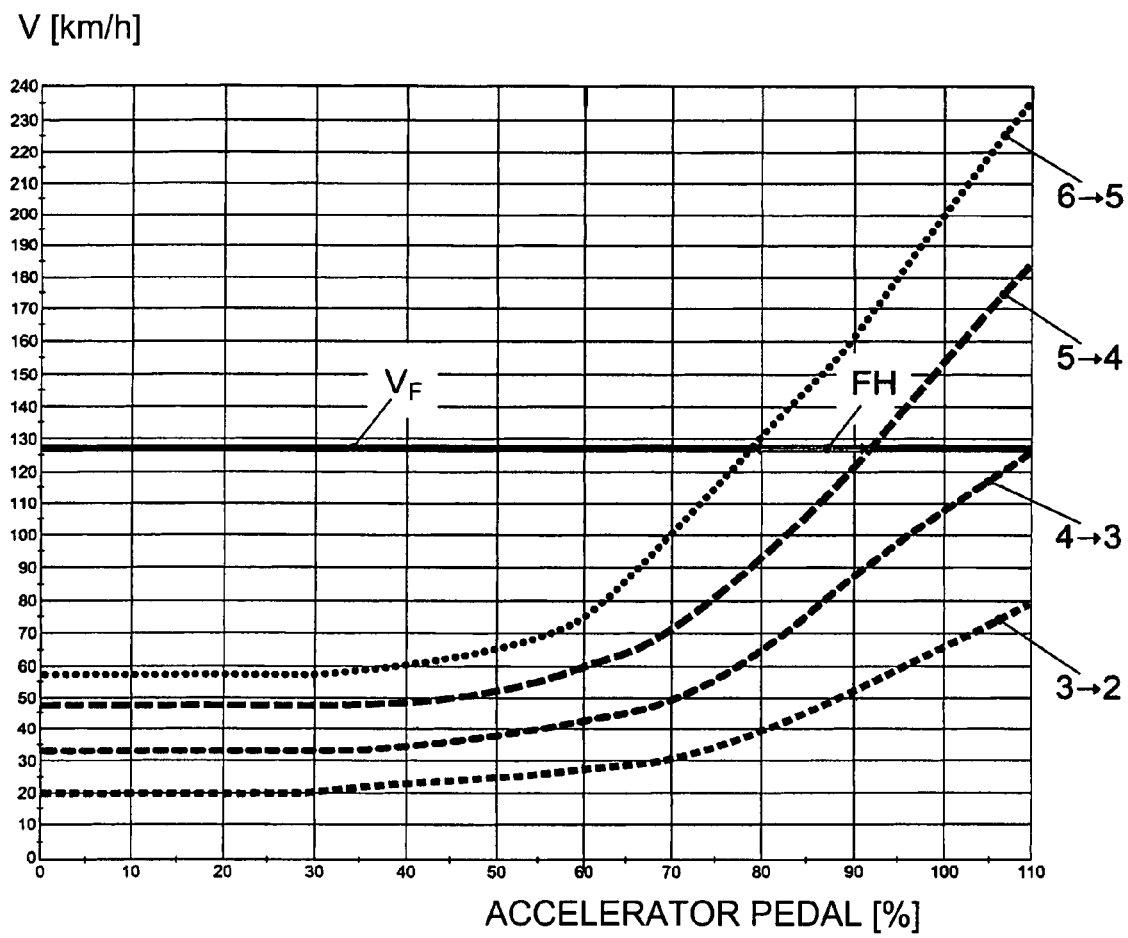
FIG. 1 is a graph illustrating a downshift characteristic map according to the prior art.
Figure 2:
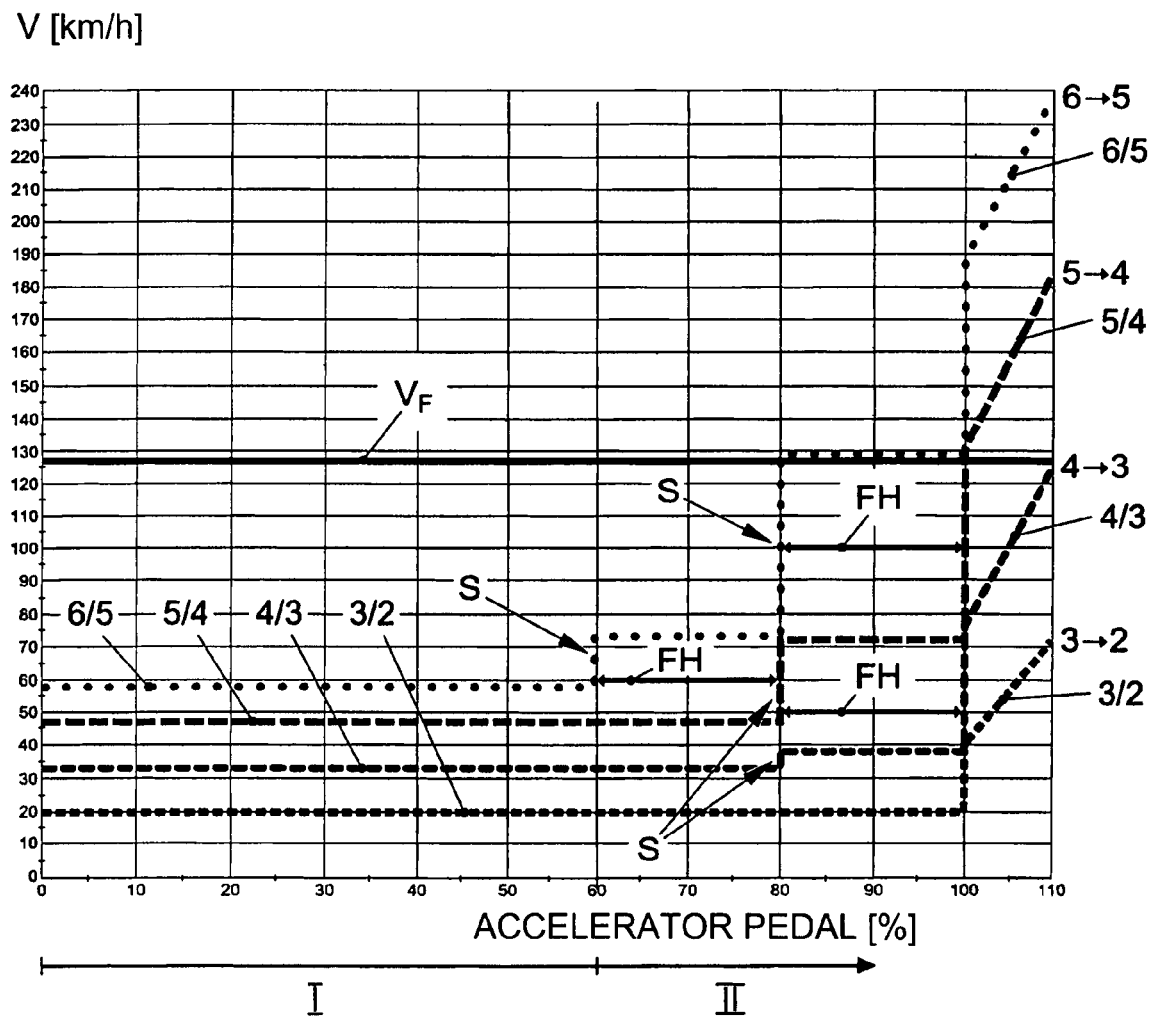
FIG. 2 is a graph illustrating an exemplary embodiment of a downshift characteristic map according to the invention.

Referring now to the figures of the drawings in detail, and first, particularly, to FIG. 1 thereof, there is shown a graph illustrating a conventional method as has been described above. FIG. 2 illustrates an exemplary mode of the method for implementing the downshifts in an automatic shift transmission in accordance with the invention.

Before the method according to the invention is explained in greater detail with respect to FIG. 2, certain terms and/or designations will be explained or defined with respect to FIG. 2.

In FIG. 2, the accelerator pedal position is shown in % on the X-axis and the vehicle speed V (km/h) is shown on the Y-axis. Also shown are the corresponding downshift thresholds (downshift characteristic curves) for the sixth to the second gear stage, i.e. for the sixth to the second gear. Specifically, the downshift characteristic curve 6/5, the downshift characteristic curve 5/4, the downshift characteristic curve 4/3, and the downshift characteristic curve 3/2 are shown. For reasons of simplification, the upshift thresholds or upshift characteristic curves, which are also stored in the control device, are not shown. The method according to the invention can be implemented in an automatic shift transmission of any kind for which it is suited.

The stored values for e.g. the downshift 6→5, which are preferably stored over an accelerator pedal position from 0% to 100%, result in the downshift threshold 6/5 that is shown in FIG. 2. This applies in a like manner for the other downshift thresholds that are shown here.

A corresponding control device is preferably provided for carrying out the method. Via sensors and corresponding control lines, current, changing driving parameters of the motor vehicle are respectively supplied to the control device in an ongoing manner. The control device preferably includes a microprocessor and a memory unit, wherein the upshift thresholds and the downshift thresholds, i.e. the respective limit values are stored in the memory unit in dependence of the accelerator pedal position, in particular, corresponding limit values/vehicle speed values are stored for each accelerator pedal position for given gear stage changes, as is evident from FIG. 2 and from the explanation above.

In the processor unit of the control device the corresponding comparisons are then performed in accordance with the driving strategy according to the invention such that in the end the comparisons have the result that the above-described disadvantages are avoided and the above-described advantages are accomplished due to the invention. The following details are provided for a further explanation.

FIG. 2 now illustrates the method for implementing the shifting from a source gear into a target gear in an automatic shift transmission, namely for downshifts in an automatic shift transmission. In this case, for each possible sequential gear shift there is stored, in a control device, in each case a downshift threshold 6/5, 5/4 and so forth, wherein the downshift threshold is defined in dependence of the accelerator pedal position, namely the limit values that are valid for the respective downshift are stored as a vehicle speed value in dependence of the respective accelerator pedal position. The vehicle speed V, which changes while the motor vehicle is driving, and the changing accelerator pedal position are preferably measured continuously. The corresponding above-mentioned limit values plotted along the deflection of the accelerator pedal form the respective downshift threshold for a given downshift.

As FIG. 2 shows, at least two of the downshift thresholds are configured to extend substantially horizontally in a first region I of the possible accelerator pedal position, and are configured to be at least partly step-shaped in a second region II of the possible accelerator pedal position. The region for the accelerator pedal position or the accelerator pedal deflection from 0% to 100% is thus plotted along the X-axis and is divided substantially in two regions namely the first region I and the second region II.

As FIG. 2 furthermore shows, the downshift thresholds 6/5, 5/4, 4/3, and 3/2 are in this case provided parallel with respect to one another in the first region I of the accelerator pedal position, i.e. they extend in this case parallel and horizontal with respect to one another. The corresponding above-mentioned downshift thresholds in the second region II of the accelerator pedal position have step-shaped sections. In other words, by using the step-shaped sections S, respective accelerator pedal supporting points are realized at the beginning (front end) of the step. Preferably a "kick-down switch" for achieving the maximum power is also provided or can be used (at the accelerator pedal position 100%).

As is shown in FIG. 2, the step-shaped sections S of adjacent downshift thresholds are configured such that the accelerator pedal hysteresis FH, which is provided between these sections S, is substantially constant and is preferably 20% of the possible total accelerator pedal deflection. The accelerator pedal hysteresis FH is in a corresponding manner schematically shown in several places in FIG. 2.

The first region I of the accelerator pedal position is essentially between 0% to 60% of the possible accelerator pedal deflection and the second region II of the accelerator pedal position involves essentially the range from 60% to 100% of the accelerator pedal deflection, as is schematically indicated below the X-axis.

The engine preferably has its full total power at 80% of the accelerator pedal position/accelerator pedal deflection. A "kick-down shift" can be performed for an accelerator pedal position/accelerator pedal deflection of greater than 100%.

A crucial point however is that by forming the step-shaped sections S of the downshift thresholds, a good reproducibility of the gear selection by the driver is ensured, because the driver can now precisely control ("meter") the gear selection, namely the driver can individually select the gears.

For example, in case of the illustrated speed of 126 km/h, which is indicated by the solid line $V_F$ in FIG. 2, a first downshift from sixth gear into fifth gear can be implemented at an accelerator pedal position of 80%. Up to that point, one has already run once through the entire engine power. The subsequent downshift from fifth gear into fourth gear occurs not until 100% accelerator pedal position, as can be seen in FIG. 2. The accelerator pedal hysteresis FH of 20%, which is provided therebetween, is thus "relatively large" and is therefore well distinguishable from the previous shift point, i.e. from the accelerator pedal position of 80%. An accelerator pedal position of 100% has preferably the additional advantage of the stop that is provided by the "kick-down switch," wherein the "kick-down switch" is not yet actuated at that point. The last shift that is possible at this speed is then performed via this "kick-down switch" at an accelerator pedal deflection of greater than 100%.

By performing the downshifts always at the same accelerator pedal position points, i.e. at the corresponding accelerator pedal positions/support points, which are defined by the step-shaped sections S, the gear selection is extremely well controllable by the driver and, in addition, a generous accelerator pedal hysteresis FH is implemented. In other words even drivers who are not very sensitive can easily select corresponding downshifts via the accelerator pedal position.

Apart from that, FIG. 2 also shows that, for example, at a vehicle speed of 50 km/h a downshift from the fifth gear stage into the fourth gear stage occurs not until the 80% accelerator pedal position, i.e. the full engine power is utilized in the so-called higher gear, namely the fifth gear. This applies in a similar manner for the first region I for the downshift threshold 4/3. The step-shaped configuration of the downshift thresholds, in particular in the second region II, i.e. the step-shaped sections S and the course of the downshift thresholds, that is otherwise arranged in parallel, therefore allow a good utilization of the full engine power while avoiding many unnecessary downshifts and at the same time providing a good controllability of the corresponding specific respective downshifts via the accelerator pedal position, in particular for drivers who are less sensitive.

LIST OF REFERENCE CHARACTERS $V_F$ vehicle speed
FH accelerator pedal hysteresis
6/5 downshift threshold from sixth gear to fifth gear
5/4 downshift threshold from fifth gear to fourth gear
4/3 downshift threshold from fourth gear to third gear
3/2 downshift threshold from third gear to second gear
S step-shaped sections
I first section
II second section

What is claimed is:

1. A method for implementing shifts from a source gear to a target gear of an automatic shift transmission, the method which comprises:
    storing a respective upshift threshold and a respective downshift threshold for each possible sequential gear shift, the respective upshift threshold and the respective downshift threshold being defined in dependence of an accelerator pedal position, such that a limit value that is valid for a respective upshift or downshift is stored as a vehicle speed value in a control device;
    configuring at least two downshift thresholds to be substantially horizontally extending in a first region of a possible accelerator pedal position and at least partly step-shaped in a second region of the possible accelerator pedal position;
    measuring a vehicle speed that changes while a motor vehicle is driving; and
    measuring a changing accelerator pedal position.

2. The method according to claim 1, which comprises configuring the downshift thresholds such that they extend parallel with respect to one another in the first region of the accelerator pedal position.

3. The method according to claim 1, which comprises configuring the downshift thresholds such that they have step-shaped sections in the second region of the accelerator pedal position.

4. The method according to claim 3, which comprises configuring the step-shaped sections of adjacent ones of the downshift thresholds such that an accelerator pedal hysteresis provided between the step-shaped sections is substantially constant.

5. The method according to claim 3, which comprises configuring the step-shaped sections of adjacent ones of the downshift thresholds such that an accelerator pedal hysteresis provided between the step-shaped sections is substantially 20% of a possible total accelerator pedal deflection.

6. The method according to claim 1, which comprises configuring the at least two downshift thresholds such that the first region of the accelerator pedal position covers substantially 0% to 60% of an accelerator pedal deflection and the second region of the accelerator pedal position covers substantially 60% to 100% of the accelerator pedal deflection.

7. The method according to claim 1, which comprises configuring an engine such that the engine reaches substantially a full total power at 80% accelerator pedal position.

8. The method according to claim 6, which comprises configuring an engine such that the engine reaches substantially a full total power at 80% accelerator pedal deflection.

9. The method according to claim 1, which comprises implementing a kick-down shift at an accelerator pedal position of greater than 100%.

10. The method according to claim 6, which comprises implementing a kick-down shift at an accelerator pedal deflection of greater than 100%.

11. The method according to claim 3, which comprises ensuring a good reproducibility of a gear selection by a driver by providing the step-shaped sections of the downshift thresholds.

12. The method according to claim 1, which comprises implementing a downshift from the source gear to target gear in the automatic shift transmission.

* * * * *